W. E. VERNON.

Coffee and Nut Roaster.

No. 9,260. Reissued June 15, 1880.

WITNESSES

Fred. G. Dieterich

Albert G. Krause

INVENTOR:

William E. Vernon by Louis Bagger & Co.

ATTORNEYS.

N. PETERS, PHOTO-LITHOGRAPHER, WASHINGTON, D.C.

UNITED STATES PATENT OFFICE.

WILLIAM E. VERNON, OF OSKALOOSA, IOWA.

COFFEE AND NUT ROASTER.

SPECIFICATION forming part of Reissued Letters Patent No. 9,260, dated June 15, 1880.

Original No. 205,589, dated July 2, 1878. Application for reissue filed May 4, 1880.

*To all whom it may concern:*

Be it known that I, WILLIAM E. VERNON, of Oskaloosa, in the county of Mahaska and State of Iowa, have invented certain new and useful Improvements in Coffee and Nut Roasters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention has relation to portable coffee or nut roasters operated by steam; and it consists, first, in the peculiar construction and combination of the portable supporting-frame, steam-generator, engine, roaster, and a receptacle for keeping the roasted nuts hot, which is heated by the waste-heat from the steam-generator, which is thus utilized; and, second, in the construction and combination of parts of the rotary roaster, substantially as hereinafter more fully set forth.

Figure 1:
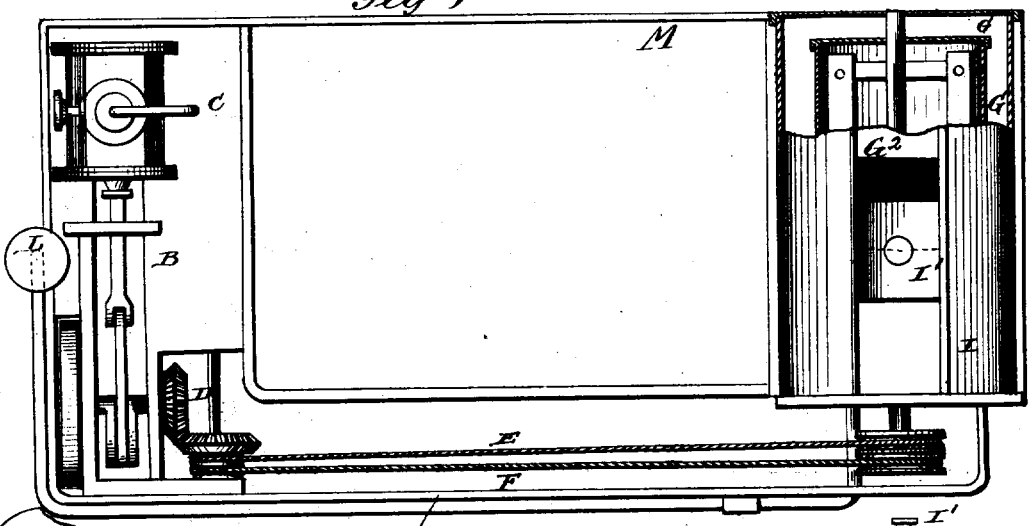
Figure 2:
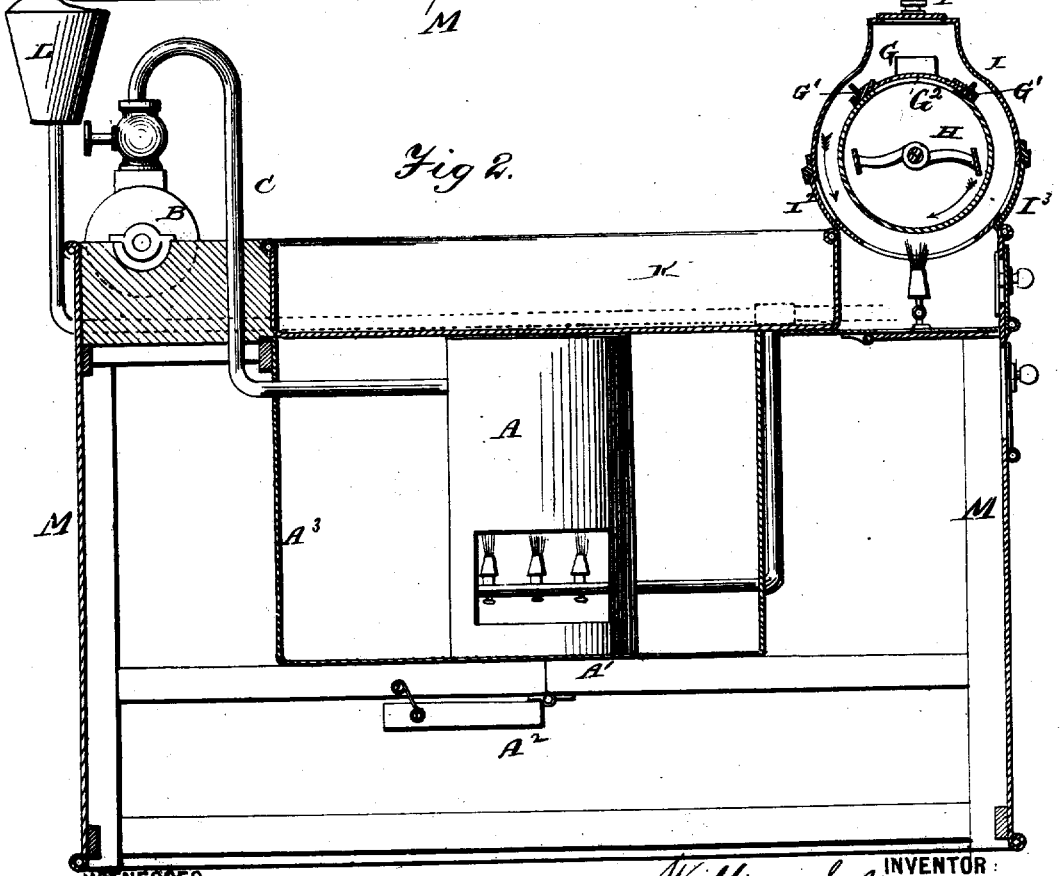

In the annexed drawings, Figure 1 is a plan view, partly in section, of an apparatus embodying my invention; and Fig. 2 is a longitudinal vertical central section of the same.

Similar letters of reference indicate corresponding parts in all the figures.

M is the frame or support, made of iron, and preferably rectangular in shape. Placed within this frame or support is the steam-generator or boiler A, which rests upon cross-beams A′, which are supported at their point of intersection by the hinged leg $A^2$, which may be folded up, as shown in Fig. 2, when the machine is being transported.

The boiler rests on the bottom of a sheet-iron chamber, $A^3$, attached to the frame, and is heated by lamps or gas-burners placed under it.

B is a small steam-engine, of any approved style, which, in the present illustration of my invention, is placed transversely upon one end of the frame.

Steam is applied to the cylinder through the pipe C, and the engine drives a bevel-wheel, D, placed on the end of the crank-shaft and communicating motion through another to pulley-driving belts E F, the former one of which communicates rotary motion to the shell G of the roaster. The other (one of the belts being crossed) communicates rotary motion in the opposite direction to the stirrer H.

The cylindrical shell G of the roaster is inclosed in an iron casing, I, provided with an opening in its top, which is covered by a slide, I′, through which the material to be operated upon may be introduced through a corresponding opening, covered by a slide, $G^2$, in the inner cylinder, on either side of which are flanges G′, intended to make a spout for delivering the material through openings covered, respectively, by the slides $I^2$ and $I^3$, when the opening in the cylinder is coincident with either of the openings in the casing.

Burners are also placed under the roasting-cylinder for the purpose of roasting the material, which may then be drawn off, through the door $I^3$ or through the door $I^2$, into the pan or receptacle K, which is placed over the boiler A and its chamber $A^3$, so that it is maintained in a heated condition for the purpose of keeping the nuts warm.

The heat may be maintained by the consumption of gasoline contained in a tank, L, and drawn through pipes to the burners placed under the boiler and roaster.

Having thus described my invention, I claim and desire to secure by Letters Patent of the United States—

1. A portable coffee and nut roaster composed of a frame, M, surrounding and supporting a casing, $A^3$, within which is inserted the steam-generator A, with its burners, a superimposed nut-receptacle, K, arranged over the boiler A and casing $A^3$, a rotary roaster arranged upon the frame and adapted to deliver the roasted nuts into the receptacle K, and an engine for operating said roaster, substantially as and for the purpose herein shown and set forth.

2. In combination, the boiler A, casing $A^3$, heating-pan or nut-receptable K, and rotary roaster G H, substantially as and for the purpose shown and set forth.

3. The combination, with the stationary casing I, having doors I′ $I^2$ $I^3$, of the rotary roaster-shell G, provided with the door $G^2$, and parallel guards or flanges G′ G′, substantially as and for the purpose herein shown and set forth.

In testimony that I claim the foregoing I have hereunto set my hand this 19th day of February, 1880.

WILLIAM ELIAS VERNON.

Witnesses:
JOHN H. HANEY,
JAMES M. GILLESPIE.